US009158901B2

(12) United States Patent
Wachtfogel et al.

(10) Patent No.: US 9,158,901 B2
(45) Date of Patent: Oct. 13, 2015

(54) GLITCH RESISTANT DEVICE

(71) Applicant: Cisco Technology Inc., San Jose, CA (US)

(72) Inventors: David Wachtfogel, Jerusalem (IL); Yaron Sella, Beit Nekofa (IL)

(73) Assignee: Cisco Technology Inc., San Jose, CA (US)

( * ) Notice: Subject to any disclaimer, the term of this patent is extended or adjusted under 35 U.S.C. 154(b) by 38 days.

(21) Appl. No.: 14/082,842

(22) Filed: Nov. 18, 2013

(65) Prior Publication Data

US 2014/0143552 A1    May 22, 2014

(30) Foreign Application Priority Data

Nov. 18, 2012 (IL) .......................................... 223102
Jun. 5, 2013 (GB) .................................... 1310006.0

(51) Int. Cl.
*H04L 29/06* (2006.01)
*G06F 21/10* (2013.01)

(52) U.S. Cl.
CPC ........ *G06F 21/10* (2013.01); *G06F 2221/0797* (2013.01)

(58) Field of Classification Search
CPC ......................... G06F 2221/0797; G06F 21/10
USPC ........................................................ 713/189
See application file for complete search history.

(56) References Cited

U.S. PATENT DOCUMENTS

| | | | |
|---|---|---|---|
| 5,530,753 A | 6/1996 | Easter et al. | |
| 5,708,715 A | 1/1998 | Vicard | |
| 5,959,936 A * | 9/1999 | Seo et al. | 365/233.1 |
| 6,006,190 A * | 12/1999 | Baena-Arnaiz et al. | 705/56 |
| 6,029,248 A * | 2/2000 | Clee et al. | 713/320 |
| 6,282,291 B1 * | 8/2001 | Kobayashi et al. | 380/43 |
| 6,571,335 B1 | 5/2003 | O'Donnell et al. | |
| 6,704,871 B1 * | 3/2004 | Kaplan et al. | 713/192 |

(Continued)

FOREIGN PATENT DOCUMENTS

EP       1 832 996 A1    9/2007

OTHER PUBLICATIONS

Nov. 8, 2013 Office Communication in connection with prosecution of GB 1310006.0.

(Continued)

*Primary Examiner* — David Garcia Cervetti
(74) *Attorney, Agent, or Firm* — Hahn Loeser & Parks LLP

(57) ABSTRACT

A system and method for device security is described, the system and method including at least one integrated circuit including a CPU, a key register storing a hardware enabling key, the key including a large number of bits, such that each bit of the large number of bits has a correct value, and if any one bit of the large number of bits is set to an incorrect value the key will not function correctly a combination circuit for performing a function, $f$, the function $f$ being essential for correct functionality of the CPU, such that the combination circuit is activated by the key, the combination circuit only performing function $f$ if each of the large number of bits of the key is set to the correct value, and there exists no set of intermediate or output bits derived from the large number of bits of the key, which determine if the combination circuit performs function $f$, the set intermediate or output bits including fewer bits than are included in the key. Related apparatus, methods, and systems are also described.

11 Claims, 2 Drawing Sheets

(56) References Cited

U.S. PATENT DOCUMENTS

| | | | |
|---|---|---|---|
| 7,490,245 B2 | 2/2009 | Waltermann et al. | |
| 7,558,969 B1* | 7/2009 | Lucero et al. | 713/193 |
| 7,818,584 B1* | 10/2010 | Joyce et al. | 713/189 |
| 8,239,686 B1 | 8/2012 | Hodzic et al. | |
| 8,699,714 B2* | 4/2014 | Tuyls et al. | 380/278 |
| 8,804,950 B1* | 8/2014 | Panwar | 380/28 |
| 8,848,905 B1* | 9/2014 | Hamlet et al. | 380/35 |
| 2002/0188857 A1* | 12/2002 | Orlando et al. | 713/193 |
| 2003/0005335 A1* | 1/2003 | Watanabe | 713/202 |
| 2004/0093505 A1* | 5/2004 | Hatakeyama et al. | 713/189 |
| 2004/0222877 A1* | 11/2004 | Teramura et al. | 340/5.65 |
| 2005/0005098 A1 | 1/2005 | Michaelis et al. | |
| 2005/0067485 A1* | 3/2005 | Caron | 235/380 |
| 2005/0190923 A1* | 9/2005 | Noh et al. | 380/278 |
| 2006/0210082 A1* | 9/2006 | Devadas et al. | 380/277 |
| 2006/0282734 A1* | 12/2006 | Milne et al. | 714/742 |
| 2007/0258582 A1* | 11/2007 | Elder et al. | 380/29 |
| 2008/0028477 A1* | 1/2008 | Lehmann et al. | 726/36 |
| 2009/0043681 A1* | 2/2009 | Shoji et al. | 705/35 |
| 2009/0083539 A1* | 3/2009 | Catherman et al. | 713/156 |
| 2009/0182919 A1 | 7/2009 | Chang et al. | |
| 2009/0202068 A1* | 8/2009 | Qureshi et al. | 380/44 |
| 2009/0276844 A1* | 11/2009 | Gehrmann et al. | 726/16 |
| 2009/0327746 A1* | 12/2009 | Greco et al. | 713/189 |
| 2010/0122353 A1 | 5/2010 | Koushanfar et al. | |
| 2010/0284539 A1* | 11/2010 | Roy et al. | 380/278 |
| 2010/0287374 A1* | 11/2010 | Roy et al. | 713/171 |
| 2010/0322418 A1* | 12/2010 | Potkonjak | 380/255 |
| 2011/0109425 A1* | 5/2011 | Kan et al. | 340/5.2 |
| 2012/0002803 A1* | 1/2012 | Adi et al. | 380/28 |
| 2012/0137137 A1* | 5/2012 | Brickell et al. | 713/182 |
| 2012/0319724 A1* | 12/2012 | Plusquellic et al. | 326/8 |
| 2012/0324238 A1* | 12/2012 | Senda | 713/189 |
| 2013/0212642 A1* | 8/2013 | Walsh et al. | 726/2 |
| 2013/0254636 A1* | 9/2013 | Kirkpatrick et al. | 714/784 |
| 2014/0108786 A1* | 4/2014 | Kreft | 713/156 |
| 2014/0111234 A1* | 4/2014 | Laackmann et al. | 324/750.3 |
| 2014/0325241 A1* | 10/2014 | Shimizu | 713/192 |

OTHER PUBLICATIONS

Rajat Subhra Chakraborty et al., "Security Through Obscurity: An Approach for Protecting Register Transfer Level Hardware IP," *2009 IEEE International Workshop on Hardware-Oriented Security and Trust*, pp. 96-99 (IEEE 2009).

Paul W. Griffin et al., "Clip: Circuit Level IP Protection Through Direct Injection of Process Variations," *IEEE Transactions on Very Large Scale Integration (VLSI) Systems* (IEEE 2011).

Jiawei Huang et al., "IC Activation and User Authentication for Security-Sensitive Systems" (2008).

Farinaz Koushnafar et al., "Designing Chips That Protect Themselves" (DAC.COM Knowledge Center Article, Mar. 2010).

Farinaz Koushnafar, "Integrated Circuits Metering for Piracy Protection and Digital Rights Management: An Overview," *GLSVLSI '11* (ACM May 4, 2011).

Jarrod A. Roy et al., "Epic: Ending Piracy of Integrated Circuits" (2008).

* cited by examiner

GLITCH RESISTANT DEVICE

RELATED APPLICATION INFORMATION

The present application claims the benefit of priority from UK patent application serial number GB 1310006.0, filed 5 Jun. 2013, and Israel patent application serial number IL 223102, filed 18 Nov. 2012.

FIELD OF THE INVENTION

The present invention relates to methods and systems for protecting information in secure devices.

BACKGROUND OF THE INVENTION

The following non-patent literature references are believed to reflect the state of the art:

EPIC: Ending Piracy of Integrated Circuits, J. A. Roy, F. Koushanfar, I. L. Markov., DATE '08, Proceedings of the conference on Design, Automation, and Test, in Europe, pages 1069-1074;

Designing Chips That Protect Themselves, F. Koushanfar and I. L. Markov, ACM DAC Knowledge Center, March 2010;

IC Activation and User Authentication for Security-Sensitive Systems, J. Huang and J. Lach, Hardware-Oriented Security and Trust, 2008. HOST 2008, pages 76-80;

Security Through Obscurity an Approach for Protecting Register Transfer Level Hardware IP, Chakraborty, R. S.; Bhunia, S., Hardware-Oriented Security and Trust, 2008. HOST 2008, pages 96-99;

CLIP: Circuit Level IC Protection Through Direct Injection of Process Variations, W. P. Griffin, A. Raghunathan, and K. Roy, IEEE Transactions on Very Large Scale Integration (VLSI) Systems, May 2012, Vol. 20, no. 5, pages 791-803; and Integrated Circuits Metering for Piracy Protection and Digital Rights Management: An Overview, F. Koushanfar, GLVSVLSI, 2011.

The following patent literature references are also believed to reflect the state of the art:

US 2009/0182919 of Chang, et al.;
US 2010/0287374 of Roy, et al.;
US 2010/0122353 of Koushanfar, et al.;
US 2010/0284539 of Roy, et al.;
U.S. Pat. No. 5,530,753 to Easter, et al.;
U.S. Pat. No. 5,708,715 to Vicard;
U.S. Pat. No. 6,571,335 to O'Donnell, et al.; and
U.S. Pat. No. 7,490,245 to Waltermann, et al.

SUMMARY OF THE INVENTION

There is thus provided in accordance with an embodiment of the present invention a system for device security, the system including at least one integrated circuit including a CPU, a key register storing a hardware enabling key, the key including a large number of bits, such that each bit of the large number of bits has a correct value, and if any one bit of the large number of bits is set to an incorrect value the key will not function correctly, a combination circuit for performing a function, f, the function f being essential for correct functionality of the CPU, such that the combination circuit is activated by the key, the combination circuit only performing function f if each of the large number of bits of the key is set to the correct value, and there exists no set of intermediate or output bits derived from the large number of bits of the key, which determine if the combination circuit performs function f, the set intermediate or output bits including fewer bits than include the key.

Further in accordance with an embodiment of the present invention each bit of the key is used by function f.

Still further in accordance with an embodiment of the present invention the key includes at least 64 bits.

Additionally in accordance with an embodiment of the present invention the set of intermediate or output bits derived from the large number of bits of the key include a single bit.

Moreover in accordance with an embodiment of the present invention the key is encrypted with an encryption function according to a key embedded in hardware.

Further in accordance with an embodiment of the present invention the cryptographic function includes a hash function.

Still further in accordance with an embodiment of the present invention the result of the cryptographic function is decrypted with a decryption function according to the key embedded in hardware.

Additionally in accordance with an embodiment of the present invention the result of a hash function of the software image is used to decrypt a value in the key register which is then used as the key.

Moreover in accordance with an embodiment of the present invention the result of a hash function of the software image is used to decrypt a value in the key register which is then decrypted with a decryption function according to a key embedded in hardware and used as the key.

Further in accordance with an embodiment of the present invention the result of a hash function of the software image is used to decrypt a cryptographically signed value in the key register which is then decrypted with a decryption function according to a key embedded in hardware and used as the key.

Still further in accordance with an embodiment of the present invention the software image is executed by the CPU included in the integrated circuit.

Further in accordance with another embodiment of the present invention a method for device security, the method including providing at least one integrated circuit including a CPU, providing a key register which stores a hardware enabling key, the key including a large number of bits, such that each bit of the large number of bits has a correct value, and if any one bit of the large number of bits is set to an incorrect value the key will not function correctly, performing a function, f, at a combination circuit, the function f being essential for correct functionality of the CPU, such that the combination circuit is activated by the key, the combination circuit only performing function f if each of the large number of bits of the key is set to the correct value, and there exists no set of intermediate or output bits derived from the large number of bits of the key, which determine if the combination circuit performs function $f$, the set intermediate or output bits including fewer bits than include the key.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
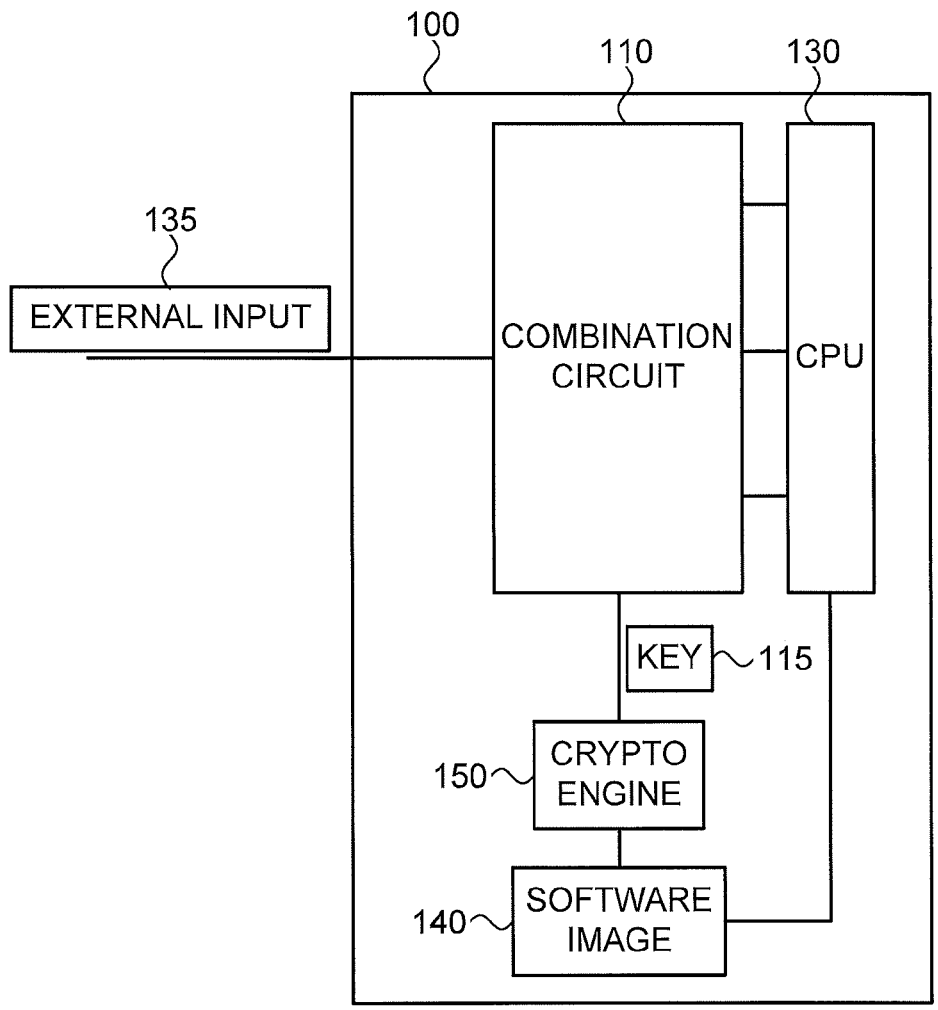
FIG. 1 is a simplified block diagram illustration of a glitch resistant device comprising a combination circuit, operative to secure the device, constructed and operative in accordance with an embodiment of the present invention.

Reference is now made to FIG. 1, which is a simplified block diagram illustration of a glitch resistant device 100 comprising a combination circuit 110, operative to secure the device, constructed and operative in accordance with an embodiment of the present invention. The device 100 is resistant to an attacker being able to glitch a function of the circuitry of the device 100 (for example, and without limiting the generality of the foregoing, a signature check function), thereby enabling the attacker to load his own code on the device 100.

The combination circuit 110 of FIG. 1 is activated, as described below, by using a hardware enabling key, stored in a key register 115. Persons skilled in the art will appreciate that the hardware enabling key typically comprises a large number of bits, for example and without limiting the generality of the foregoing, on the order of 64 bits.

The device 100 of FIG. 1 also comprises a central processing unit (CPU) 130.

The combination circuit 110 performs a function f. One exemplary function which may be used for f is described below, with reference to FIG. 2. The function f is essential for correct functionality of the CPU 130. When the combination circuit 110 is activated by the key, the combination circuit 110 only performs function f if each bit of the large number of bits of the key is set to the correct value. Furthermore, there exists no set of intermediate or output bits derived from the large number of bits of the key, which determine if the combination circuit performs function f, where the set intermediate or output bits comprising fewer bits than comprise the key. It is appreciated that the subset of bits may not even contain a single bit (e.g. a 0/1 "go/no go" decisions bit) resulting from operations on all of the bits of the key.

Additionally, in some embodiments, each bit of the key is used by function f.

The combination circuit 110 receives inputs from the CPU 130 and the key register 115. The input from the key register 115 is typically a multi-bit input. Additional external inputs 135 (i.e. external to the device 100, and not coming via CPU 130) may also be received by the combination circuit 110. The combination circuit 110 performs calculations which produce an output that typically goes to the CPU 130. Some outputs of the combination circuit 110 may, however, be exported from the device 100 not via the CPU 130.

If a correct value of the key (i.e. each input bit of the plurality of bits comprising the key) stored in the key register 115 is input to the combination circuit 110, then the combination circuit 110 will be successfully activated, and therefore, will produce correct results when performing calculations. However, if an incorrect value of the key stored in the key register 115 is input into the combination circuit 110, then the combination circuit 110 will be not be successfully activated. That is to say that each bit of the key has a correct value, and if even a single bit among the plurality of bits which comprise the key is wrong (i.e. set to an incorrect value), then the result of the calculation will yield an incorrect output, and the combination circuit 110 will either perform erroneous calculations thereby producing incorrect results, or, alternatively, remain inoperative.

It is appreciated in the above discussion that the calculations which are performed correctly when the combination circuit 110 is successfully activated and performed incorrectly when the combination circuit 110 is not successfully activated are calculations which are essential for the correct functioning of the device 100. For example, and without limiting the generality of the foregoing, cryptographic operations may be dependent on the successful activation of the combination circuit 110. Should those cryptographic operations produce incorrect outputs, then further operations dependent on receiving the output of those cryptographic operations as inputs will themselves either produce no output, meaningless outputs, or incorrect outputs.

Figure 2:
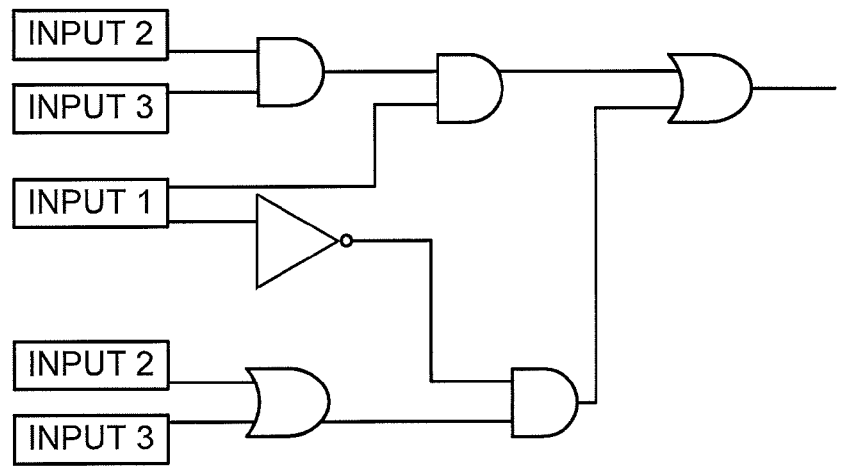
FIG. 2 is one logic circuit of an exemplary combination in the glitch resistant device of FIG. 1.

Reference is now additionally made to FIG. 2, which is one logic circuit of an exemplary combination in the glitch resistant device 100 of FIG. 1. In the logic circuit of FIG. 2, the following truth table is implemented:

If Input1=0, then output=Input2 OR Input3;

If Input1=1, then output=Input2 AND Input3;

Thus:

| Input 1 | Input 2 | Input 3 | Output |
|---------|---------|---------|--------|
| 0 | 0 | 0 | 0 |
| 0 | 0 | 1 | 1 |
| 0 | 1 | 0 | 1 |
| 0 | 1 | 1 | 1 |
| 1 | 0 | 0 | 0 |
| 1 | 0 | 1 | 0 |
| 1 | 1 | 0 | 0 |
| 1 | 1 | 1 | 1 |

Accordingly, in the description of FIG. 1 above, if the combination circuit 110 should be a logical AND in order that the combination circuit be properly activated, then the key stored in the key register 115, which is Input1 in the table above, must be an input of 1. In such a case, the output of the combination circuit 110 would be Input2 AND Input3. In the present example, this is the "correct" output from the combination circuit 110.

Alternatively, if the key stored in the key register 115 is incorrect (i.e., 0), then the logic circuit depicted in FIG. 2 would perform a logical OR, i.e. Input1 is 0, and thus, the output is Input2 OR Input3. Since the output from the combination circuit 110 should be (Input2 AND Input3) and not (Input2 OR Input3), the output from the combination circuit is, therefore, for the most part incorrect.

To explain why it is that the output from the combination circuit 110 is, for the most part, incorrect, consider the cases of:

1. Input1=0, Input2=1,Input3=1 then Output =1

2. Input1=1, Input2=1,Input3=1 then Output =1

In this case, as well as the case where Input2 and Input3 are both equal to 0, the output is the same, regardless of the value of Input1.

However, since the combination circuit 110 comprises more than just a single circuit (e.g. the logic circuit depicted in FIG. 2), and each of the circuits in the combination circuit 110 must produce a correct output according to key stored in the key register 115, the likelihood of each logic circuit comprising the combination circuit 110 outputting a correct output even when the key stored in the key register 115 provides every logic circuit in combination circuit 110 with an incorrect input quickly approaches zero.

The following terms are defined as follows for use in the ensuing discussion of an embodiment of operation of the device 100 of FIG. 1:

| TERM | DEFINITION |
|---|---|
| HWSEC1 | A secret key needed to make critical hardware functionality operational. For example the bits of this key could determine how specific logic gates in the design are connected. The hardware functionality thus enabled should preferably include the ability to run software from external memories. |
| HWSEC2 | A secret value embedded into the hardware. |
| HOI | A cryptographic hash (digest) of a software image 140. |
| RSA-Sig | An RSA signature securely generated offline and checked by the chip hardware. |
| e | RSA public key |
| d | RSA private key |

It is also appreciated that in the following discussion, the symbol $\|$ is used to refer to concatenation, and not in any of the other various possible accepted meanings of the symbol.

Cryptographic operations, such as, but not limited to:

calculations of the RSA signature of the software image 140;

AES encryption/decryption;

computation of hash functions; and so forth, are generically indicated in FIG. 1 as being performed by a crypto engine 150. The precise software and hardware mechanisms for execution of the cryptographic operations should be apparent to persons of skill in the art, and, in the interest of brevity, are not mentioned here in any detail. For example, certain cryptographic operations which may be performed in specialized hardware in an integrated circuit may also be performed in ROM software.

1. Instead of RSA-Sig being $(HOI\|padding)^d$, it is $(AES_{HWSEC2}(AES_{HOI}HWSEC1)\|HOI\|padding)^d$.

2. The crypto engine 150 hashes the software image 140 to get HOI.

3. The CPU 130 or other hardware on the chip reads RSA-Sig as it is appended to the software image 140.

4. The CPU 130 then performs the following steps:
   a. Calculates $(RSA-Sig)^e$. The result of the calculation of $(RSA-Sig)^e$ is stored in a separate register and not in the same register as RSA-SIG, since RSA-SIG is needed for further calculations, as noted below.
   b. Verifies that the calculated result of (RSA-Sig)e is correct—i.e. that the HOI from RSA-Sig equals the calculated HOI and that the padding is correct (note: this check could be glitched by an attacker, but this isn't critical to the security of the scheme). If this check were to be glitched by the attacker, the ensuing calculations will still utilize the stored value of RSA-SIG. If the value of RSA-SIG is not correct, then these calculations will still yield incorrect outputs.
   c. Decrypts the first 16 bytes of the result using HWSEC2 and the HOI calculated by the CPU 330 and inserts the results (which are expected to be HWSEC1) into a hardware register.
   d. The hardware logic uses these registers to make the combination circuit 110 operational.

5. If the signature is incorrect then critical hardware functionality in the combination circuit 110 will either perform incorrectly or will not be operational.

It is appreciated that the key stored in the key register 115 used in the cryptographic operations is typically embedded in the device 110 hardware. As was noted above, persons skilled in the art will appreciate that the key typically comprises a large number of bits, for example and without limiting the generality of the foregoing, on the order of 64 bits.

In some embodiments HOI may be used as an additional cryptographic key to decrypt the key stored in the key register 115, which may be stored in an encrypted form in on-chip memory. In such a case, the key stored in the key register 115 may also be cryptographically signed using the additional cryptographic key.

It is further appreciated that the software image 140 is typically a software image 140 of software meant to be executed by the CPU 130.

It is appreciated that references above to RSA and AES are by way of example only. RSA may, in any place where it is mentioned above, be replaced by an appropriate encryption-based public-key signature scheme (e.g., Cramer-Shoup and El Gamal, as is known in the art.) AES, may, in any place where it is mentioned above, be replaced by an appropriate symmetric cipher (e.g. TwoFish, RC6, as is known in the art).

Figure 3:
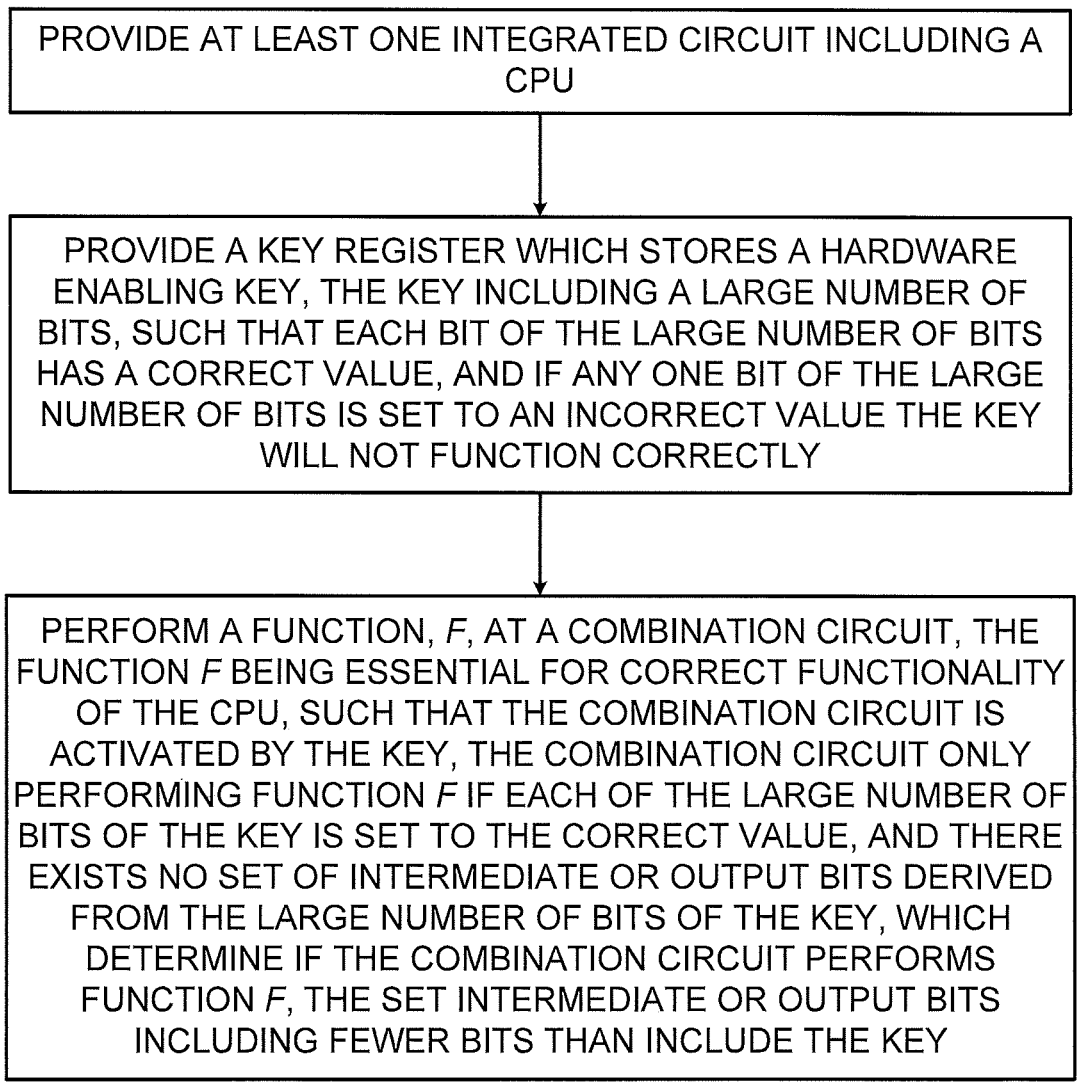
FIG. 3 is a simplified flowchart diagram of methods of operation of the system of FIG. 1.

Reference is now made to FIG. 3, which is a simplified flowchart diagram of methods of operation of the system of FIG. 1. The method of FIG. 3 is believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system for device security, the system comprising:
   at least one integrated circuit comprising a CPU;
   a key register storing a hardware enabling key, the key comprising a number of bits, such that each bit of the number of bits has a value, and if any one bit of the number of bits is set to an incorrect value the key will not function correctly;
   a combination circuit for performing a function, $f$, such that the combination circuit is activated by the key, the combination circuit only performing function $f$ if each one of the number of bits of the key is set to the value of that one bit, and there exists no set of intermediate or output bits derived from the number of bits of the key, which determine if the combination circuit performs function $f$, said set intermediate or output bits comprising fewer bits than comprise the key.

2. The system according to claim 1 wherein each bit of the key is used by function $f$.

3. The system according to claim 1 wherein the key comprises at least 64 bits.

4. The system of claim 1 wherein the set of intermediate or output bits derived from the number of bits of the key comprise a single bit.

5. The system according to claim 1 wherein the key is encrypted with an encryption function according to a key embedded in hardware.

6. The system according to claim 1 wherein the key comprises a result of a hash function.

7. The system according to claim 1 wherein the result of a hash function of a software image is used to decrypt a value in the key register which is then used as the key.

8. The system according to claim 1 wherein the result of a hash function of a software image is used to decrypt a value in the key register which is then decrypted with a decryption function according to a key embedded in hardware and used as the key.

9. The system according to claim 1 wherein the results of a hash function of a software image is used to decrypt a cryptographically signed value in the key register which is then decryption function according to a key embedded in hardware and used as the key.

10. The system according to claim 1 wherein a software image is executed by the CPU comprised in the integrated circuit.

11. A method for device security, the method comprising:

providing at least one integrated circuit comprising a CPU;

providing a key register which stores a hardware enabling key, the key comprising a number of bits, such that each bit of the number of bits has a value, and if any one bit of the number of bits is set to an incorrect value the key will not function correctly;

performing a function, f, at a combination circuit, such that the combination circuit is activated by the key, the combination circuit only performing function f if each one of the number of bits of the key is set to the value of that one bit, and there exists no set of intermediate or output bits derived from the number of bits of the key, which determine if the combination circuit performs function f, said set intermediate or output bits comprising fewer bits than comprise the key.

* * * * *